US008417562B1

(12) United States Patent
Siemens (10) Patent No.: US 8,417,562 B1
(45) Date of Patent: Apr. 9, 2013

(54) GENERATING A SCORE OF A CONSUMER CORRECTION SUBMISSION (75) Inventor: Ronald G. Siemens, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 1134 days.

(21) Appl. No.: 12/137,481

(22) Filed: Jun. 11, 2008

Related U.S. Application Data (60) Provisional application No. 60/944,386, filed on Jun. 15, 2007.

(51) Int. Cl.
G06Q 10/00 (2012.01)
G06Q 30/00 (2012.01)
G06F 15/16 (2006.01)

(52) U.S. Cl. ............... 705/7.38; 705/7.41; 705/27.1; 707/999.1; 709/204

(58) Field of Classification Search ............ 705/1, 26.1; 707/5, 100; 706/12, 50, 60
See application file for complete search history.

(56) References Cited

U.S. PATENT DOCUMENTS

| 6,574,614 | B1 | 6/2003 | Kesel | |
|---|---|---|---|---|
| 6,629,098 | B2 | 9/2003 | Mc George, Jr. | |
| 6,983,323 | B2 | 1/2006 | Cantrell et al. | |
| 7,461,033 | B1 * | 12/2008 | McConnell et al. | 706/12 |
| 7,483,903 | B2 | 1/2009 | Kulkarni et al. | |
| 7,881,974 | B1 * | 2/2011 | Thirumalai et al. | 705/26.1 |
| 2002/0026440 | A1 | 2/2002 | Nair | |
| 2002/0198940 | A1 * | 12/2002 | Bower et al. | 709/204 |
| 2005/0060324 | A1 * | 3/2005 | Johnson et al. | 707/100 |
| 2005/0075946 | A1 | 4/2005 | Henning et al. | |
| 2006/0048016 | A1 | 3/2006 | Reindler et al. | |
| 2006/0085108 | A1 * | 4/2006 | Grier et al. | 701/29 |
| 2007/0219863 | A1 * | 9/2007 | Park et al. | 705/14 |
| 2007/0297337 | A1 | 12/2007 | Beygelzimer et al. | |
| 2008/0082352 | A1 * | 4/2008 | Schmidtler et al. | 705/1 |
| 2008/0097835 | A1 | 4/2008 | Weiser | |

OTHER PUBLICATIONS

U.S. Appl. No. 12/137,468, filed Jun. 11, 2008, Amazon Technologies, Inc., all pages.

* cited by examiner

Primary Examiner — Matthew Gart
Assistant Examiner — Reva R Danzig
(74) Attorney, Agent, or Firm — Robert C. Kowert; Meyertons, Hood, Kivlin, Kowert & Goetzel, P.C.

(57) ABSTRACT

Systems and methods for generating a score for use in automated processing of correction submissions are presented. In one embodiment, a submission value from a correction submission obtained from a submitter is obtained. The submission value corresponds to a proposed correction of an attribute of an item, the item having a plurality of attributes that describe the item, and the submission value corresponds to one of the plurality of attributes of the item. The current attribute value of the item that corresponds to the submission value is obtained. A first set of characterization values is generated for the submission value according to a first set of criteria. A second set of characterization values for the current attribute value is generated according to a second set of criteria. Using the first and second sets of characterization values, a score is generated for the correction submission. The score is stored in a data store in association with the correction submission.

15 Claims, 7 Drawing Sheets

Harry Potter and the Deathly Hallows (Book 7)
Inventory ID: 19600715-19601228

Title

Current Title
Harry Potter and the Deathly Hallows (Book 7)

Your suggestion
[                    ]

Author

Current Author #1
J. K. Rowling

Your suggestion
[                    ]

Current Author #1 Function
Author

Your suggestion
[Author           ▼]

Current Author #2
Mary GrandPré

Your suggestion
[                    ]

Current Author #2 Function
Illustrator

Your suggestion
[Illustrator       ▼]

[ Add Another Author ]

Binding

Current Binding
Hardcover

Your suggestion
[Hardcover        ▼]

Publication Date

Current Publication Date
2007-07-21

Your suggestion
[2007 ▼] [July - 07 ▼] [21]

Number of Pages

Current Number of Pages
784

Your suggestion
[                    ]

Edition

Current Edition
–

Your suggestion
[                    ]

Format

Current format
–

Your suggestion
[                    ]

[ Submit Changes ]

*Fig. 3.*

It Won't Be Soon Before Long
Inventory ID: 01021965

Title
Current Title  
It Won't Be Soon Before Long

Your suggestion  
[                    ]

Artist/Band
Current Artist #1  
Maroon 5

Your suggestion  
[                    ]

Current Artist #1 Function  
Author

Your suggestion  
[ Artist          ▼ ]

[ Add Another Artist ]

Label
Current Label  
A&M / Octone Records

Your suggestion  
[                    ]

Binding
Current binding  
Audio CD

Your suggestion  
[                    ]

Format
Current Format #1  
—

Your suggestion  
[                    ]

[ Add Another Format ]

[ Submit Changes ]

GENERATING A SCORE OF A CONSUMER CORRECTION SUBMISSION

CROSS-REFERENCES TO RELATED APPLICATIONS

This application claims the benefit of U.S. Provisional Application No. 60/944,386, filed Jun. 15, 2007, which is incorporated herein by reference. This application is also related to co-pending U.S. patent application Ser. No. 12/137,468, filed Jun. 11, 2008, entitled "Automated Acceptance or Rejection of Consumer Correction Submissions."

BACKGROUND

In order to inform consumers about available products and services, particularly when the consumers evaluate products, or services remotely over a network, the vendor site must provide accurate and robust descriptions about each and every product and service available. For those vendors that offer a large, disparate product line(s) or services, keeping the descriptions accurate is, quite frequently, an enormous task.

Typically, vendors offer products and services from suppliers, though there are many that offer products and services from other consumers. While these suppliers and consumers will typically provide a description regarding each product or service offered, they are prone to errors and omissions, such that their product or service descriptions ought to be updated. While the suppliers can and do provide updates and corrections to the products and services they offer through a vendor site, quite frequently it is the consumer (i.e., one particularly interested and informed regarding a product) that is most aware of an inaccurate description, as well as how the correct description should read.

Currently, for at least some vendors, when a consumer visits a vendor's site and becomes aware of a product or service description that should be corrected, the consumer submits correction data to the vendor. The vendor then utilizes human evaluation to compare the submitted correction data with existing product service or description prior to making any correction. If the vendor (via the human reviewer) believes the consumer's suggestions are correct, the vendor will amend the description accordingly. Unfortunately, when the number of products or services that the vendor offers is large and the number of corrections that are submitted becomes commensurately large, the review process becomes unwieldy.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

While the following discussion will be made with regard to correcting an item description, such as one describing a product for sale on a vendor's electronic marketplace, these principles of evaluating corrected text may be suitably applied to a variety of circumstances including, but not limited to, generally evaluating third-party corrections with regard to descriptions of any number of items, such as products, services or other types of offerings. For example, correction submissions may be made with regard to descriptions of rental or lease items, with regard to services being offered, descriptions of real estate listings, and the like. An "item" as used herein, refers to any type of object, product, service, offering, etc. for which a description may be provided. Accordingly, while the following discussion is made in regard to receiving consumer correction submissions and evaluating them for acceptance or rejection, this should be viewed as illustrative of a particular embodiment, and should not be construed as limiting upon the disclosed subject matter.

Figure 1:
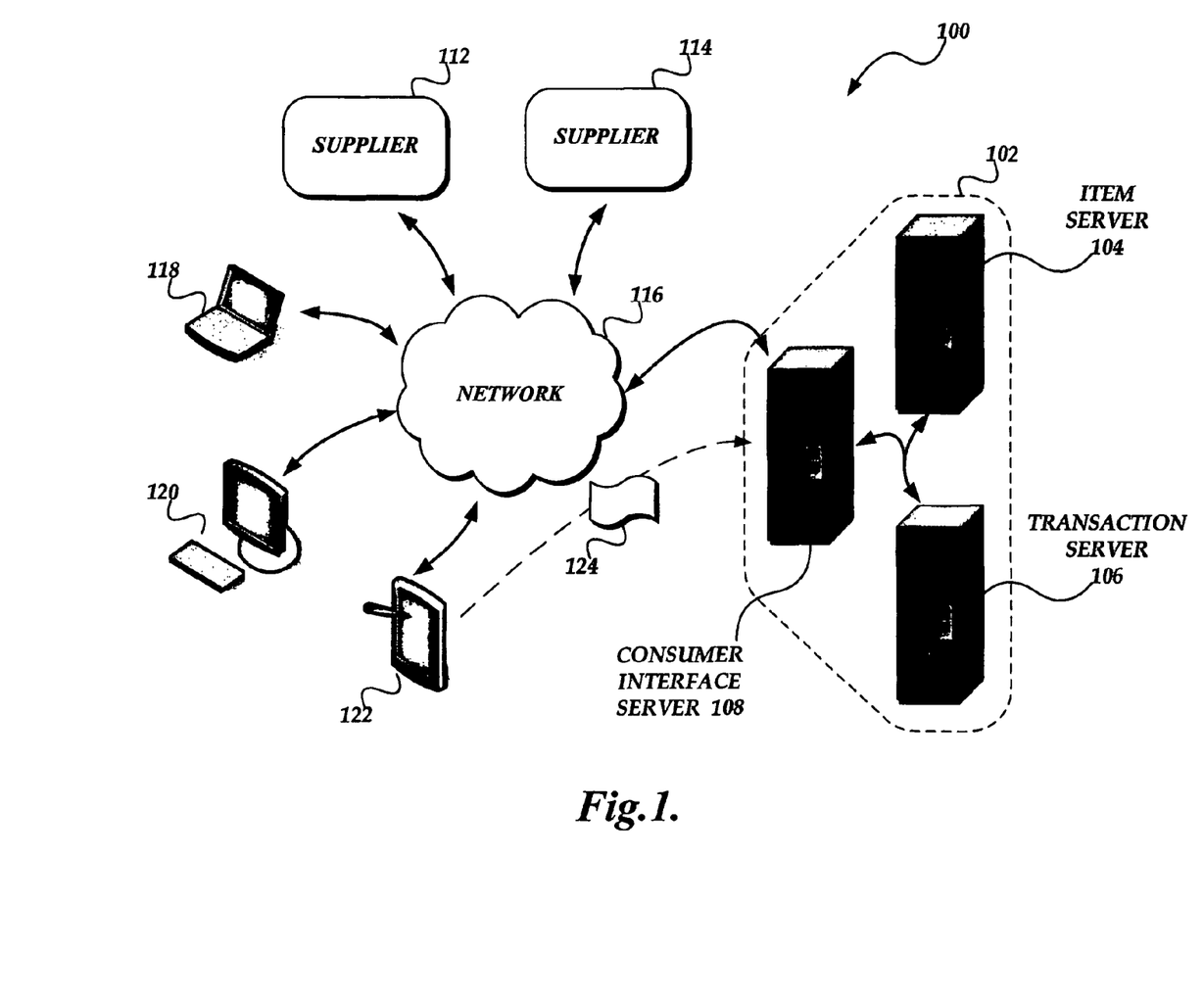
FIG. 1 is a block diagram of an example network environment suitable for obtaining and responding to correction submissions.

Turning now to FIG. 1, this is a block diagram of an example network environment 100 suitable for obtaining and responding to consumer correction submissions. As shown in FIG. 1, the network environment 100 includes a vendor site 102 for offering items to consumers, via consumer devices such as consumer devices 118-122, over a network 116. The illustrated vendor site 102 offers items from suppliers 112 and 114, who may be configured to provide descriptions for the items to the vendor site 102 over the network 116.

While a vendor site 102 may be comprised on a single node on the network 116, the disclosed subject matter is not so constrained. As shown in FIG. 1, in one embodiment, the vendor site 102 may be comprised of multiple nodes and/or servers. In the illustrated example, the vendor site 102 includes an item server 104 for at least providing information regarding items available through the vendor site; a transaction server 106 for conducting rent or purchase transactions with a consumer for an item; and a consumer interface server 108 that provides the consumer interface, sometimes referred to as the electronic marketplace, for the vendor site 102.

As further shown in FIG. 1, a consumer, via consumer device 118-122, may provide a correction submission 124 to the vendor site 102. According to various embodiments, the vendor site will evaluate and determine a score for the consumer's correction submission 124 and, based on the determined score, as well as information regarding the consumer, such as historical accuracy or reputation, either automatically accept the consumer's correction, automatically reject the consumer's correction, or pass the consumer's correction submission on for further evaluation.

Figure 2:
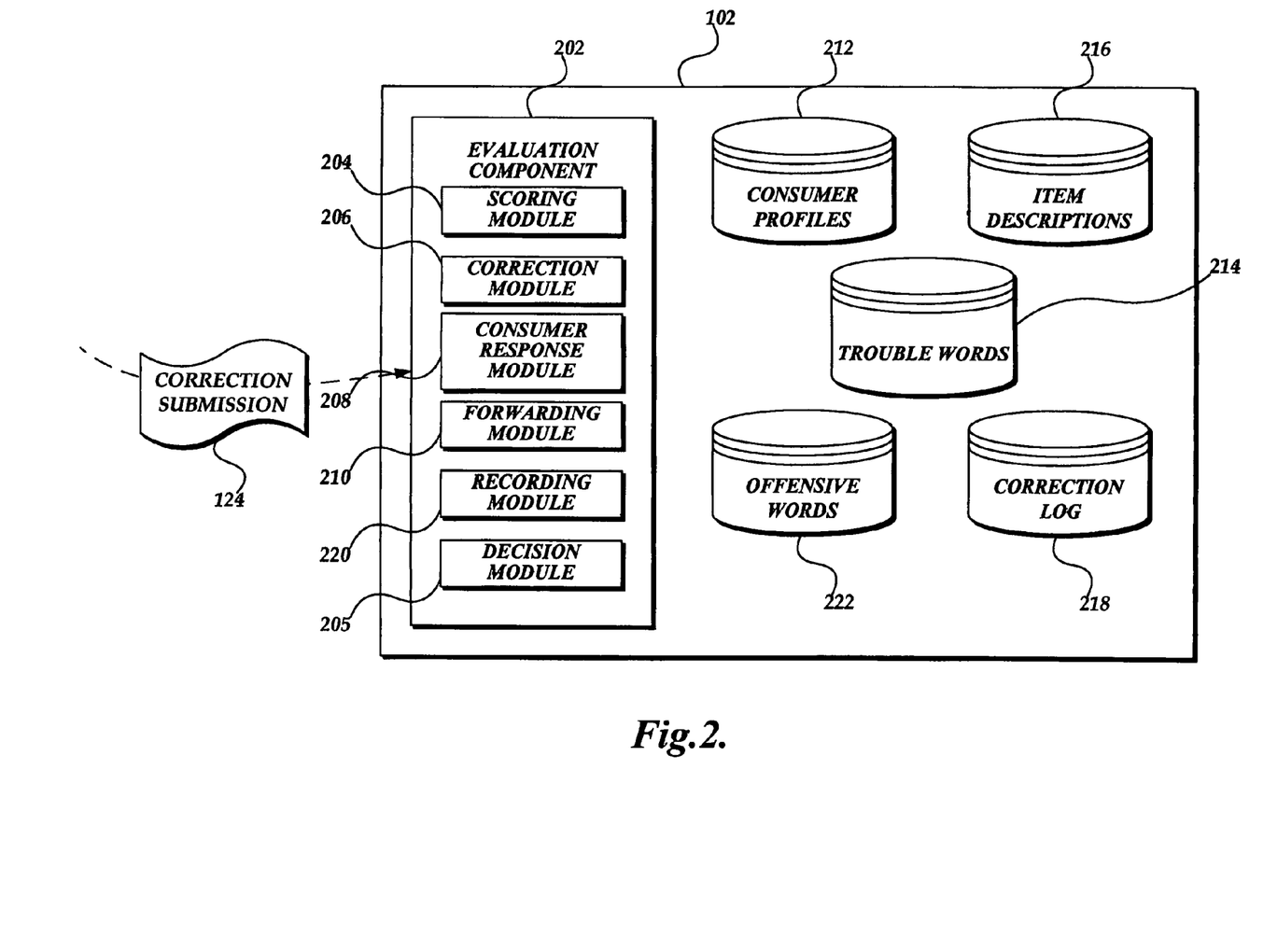
FIG. 2 is a block diagram illustrating exemplary logical components of a vendor site that maintains product descriptions for a plurality of items, and that further evaluates consumer correction submissions for acceptance or rejection.

While in FIG. 1 a vendor site 102 is illustrated as comprising multiple discrete computing devices 104-108, in an alternative embodiment, the vendor site 102 may be configured as a single node and/or computer server. Moreover, it is, in part, advantageous to discuss the vendor site 102 in terms of its logical components. To that end, FIG. 2 is a block diagram illustrating logical components of a vendor site 102 that maintains descriptions for a plurality of items, and that evaluates consumer correction submissions, such as consumer correction submission 124, for automatic acceptance or rejection, or for forwarding for further evaluation.

While comprised of physical components for executing instruction codes, including a processor and memory (not shown) that are ubiquitously found in a computing device, the illustrated vendor site 102 includes an evaluation component 202 that, upon receipt of a consumer correction submission 124, determines whether the consumer correction submission should be accepted, rejected, or forwarded on to another process (or person) for further evaluation. The vendor site 102 also includes an item descriptions data store 216 that stores item descriptions for a plurality of items available from the vendor site 102. Still further, the vendor site 102 includes a consumer profile data store 212 that stores consumer profiles for each of a plurality of consumers. A consumer's profile may include information such as whether or not the consumer is explicitly preauthorized such that any corrections are automatically accepted and/or a consumer rating for the consumer indicating one or more ratings the vendor associates with the consumer regarding entering corrections. A high confidence rating may indicate that particular corrections by that consumer are always accepted or at least substantial deference is given to the corrections from that consumer. The consumer ratings may be based on the number of correction submissions, the percentage of successful correction submissions (i.e., those that are accepted by the vendor site 102) versus those that are rejected, and the like. In addition to the consumer's rating, the various factors (as mentioned above) affecting the consumer's profile may themselves be stored and maintained in the consumer's profile in the consumer profile data store 212.

As changes/corrections are accepted and made, the vendor site 102 may also maintain a log or history of the changes. While a log or history may be stored in any number of locations, including the item descriptions data store 216, logically this information may be viewed as being stored in a correction log data store 218. In addition to storing information regarding corrections, the correction log data store 218 may include information such as previously rejected correction submissions. Previously rejected correction submissions may be used to quickly evaluate future consumer correction submissions such that duplicates can be readily rejected.

Further shown, as a logical component of the vendor site 102, is a trouble words data store 214 and an offensive words data store 222. The trouble words data store 214 identifies various symbols, words, terms, and/or phrases whose presence may indicate reason to further evaluate the proposed corrections. Similarly, the offensive words data store 222 identifies words, terms, and/or phrases that have the potential to offend, be considered vulgar, or otherwise be inappropriate. As will be made more apparent below, words, terms or phrases within either of the trouble words data store 214 or the offensive words data store 222 may suggest inappropriate language in the proposed correction or be indicative of a consumer expressing anger or frustration such that accepting corrections with these words/phrases must be made cautiously. However, sometimes item descriptions, such as titles or names of songs, etc., may include such language and/or terms. In short, while consumer correction submissions with words and phrases found in the trouble words data store 214 or the offensive words data store 222 may raise a red flag when such corrections are submitted, the mere presence of the words, terms or phrases does not mean that the correction submission can simply be ignored and rejected.

As shown in FIG. 2, the evaluation component 202 includes various logical subcomponents or modules to carry out various functions in determining whether a consumer's correction submission 124 should be accepted, rejected or forwarded for further evaluation. These modules include a scoring module 204 that determines a score for a consumer correction submission based on the results of various evaluations performed on the correction submission 124, a decision module 205 that takes the score of a submitted correction and determines whether it should be accepted, rejected, or forwarded on for further evaluation, a correction module 206 that makes the corrections to the item description in the item descriptions data store 216, a consumer response module 208 that optionally notifies the consumer that the consumer's correction submission was accepted or rejected and a forwarding module 210 that forwards the correction submission on for additional processing and/or evaluation under certain circumstances. Yet another logical module of the evaluation component 202 is a recording module 220 that records the results of the correction submission in the correction log data store 218. Those skilled in the art will appreciate that there may be other modules included in an actual evaluation component 202 that are not discussed or illustrated here. For example, an audit module (not shown) may be included in an evaluation component 202 that would cause an audit to be performed on a certain percentage of accepted correction submissions. Accordingly, the above illustrated and described components and modules should be viewed as illustrative, and not construed as limiting upon the disclosed subject matter.

It should be appreciated that the above components, modules, and subcomponents of the illustrated vendor site 102 are logical components that may be configured and combined in any number of actual embodiments, or one of a plurality of computing devices, nodes, and/or servers and combined with other components not described herein (for clarity purposes). Accordingly, the above-described configuration should be viewed as illustrative only, and not construed as limiting upon the disclosed subject matter.

With regard to items and their corresponding descriptions, as will be readily appreciated by those skilled in the art, each item is associated with at least one descriptive attribute, and each descriptive attribute may contain a descriptive value. It is the descriptive values associated with the descriptive attributes that comprise the correctable aspects of a product description. Most frequently, though not always, each item is associated with a plurality of descriptive attributes, and each descriptive attribute is associated with at least one descriptive value. Still further, items are typically categorized according to type, such that items of a given type have common descriptive attributes. Examples of item types may include books, music, videos, digital video discs (DVDs), consumer electronics, rentals, services, and the like.

Figure 3:
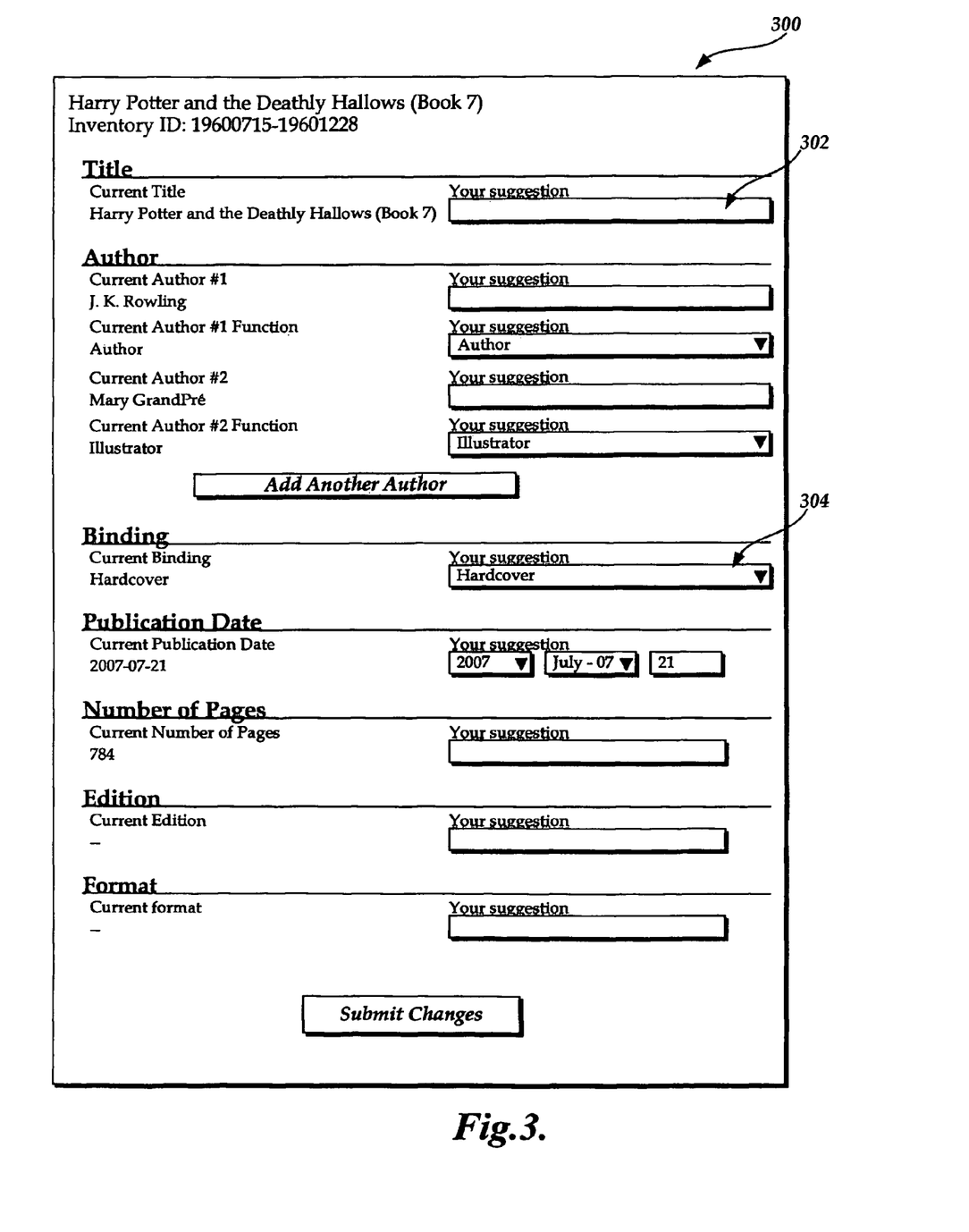
FIG. 3 is a pictorial diagram illustrating an exemplary browser page displaying descriptive attributes of a book with its current descriptive values displayed in editable or configurable fields.
Figure 4:
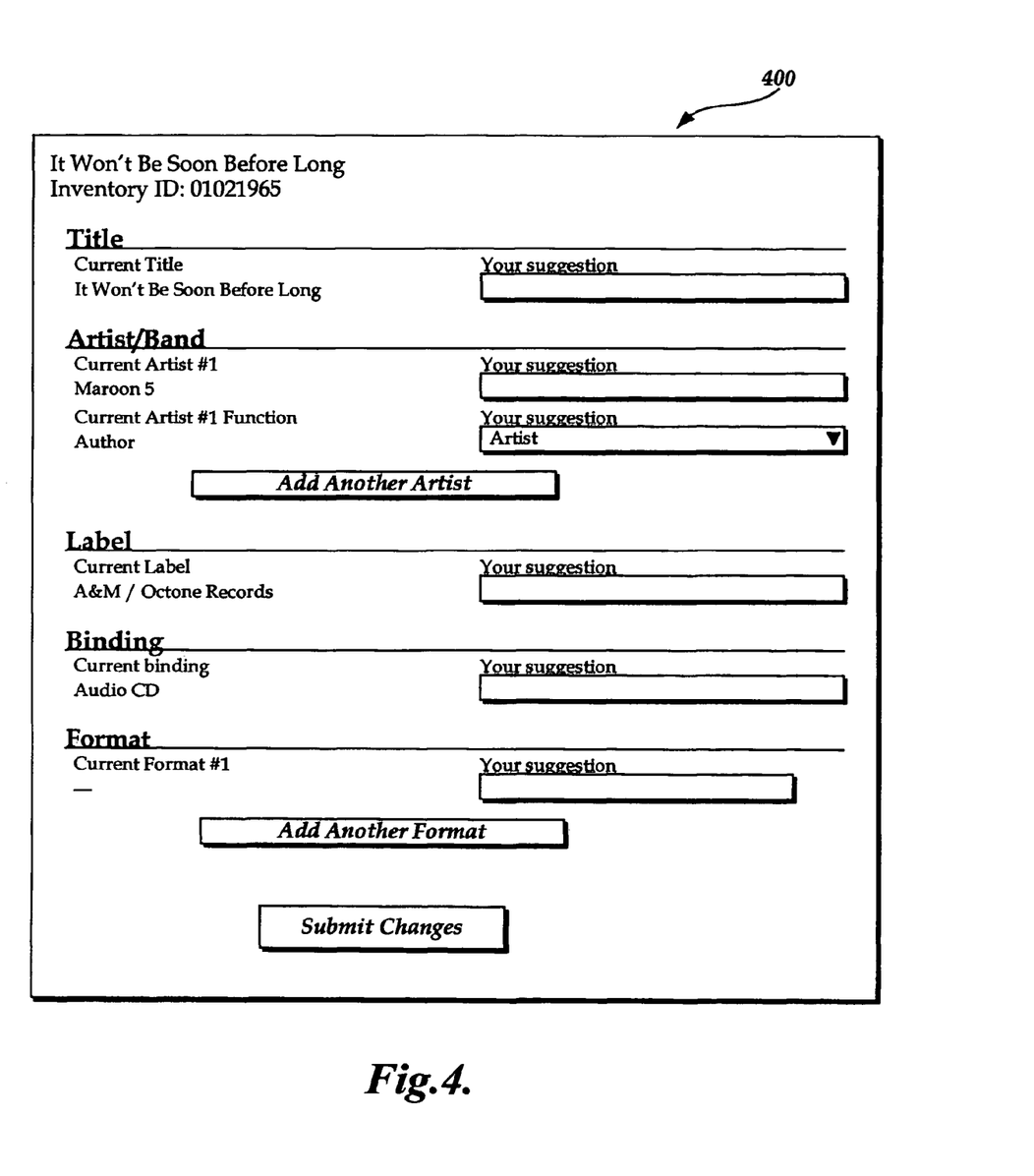
FIG. 4 is a pictorial diagram illustrating an exemplary browser page displaying descriptive attributes of an audio CD with its current descriptive values displayed in editable or configurable fields.

An example of descriptive attributes associated with an item type is as follows with regard to books: title, author, binding, publication date, publisher, number of pages, edition, format, and language. Many of these descriptive attributes can be further defined into subattributes, and each descriptive value may be comprised of one or more entries. Still further, each entry may be comprised of a pair or tuple of values. Referring to the descriptive attribute "author," a book may have two or more authors and each should be listed. Moreover, each "author" may be identified for the particular type of contribution made, based on set of criteria such as author, adapter, collaborator, colorist, compiler, designer, drawings, editor, epilogue, foreword, illustrator, introduction, narrator, photographer, painter, reader, technical editor, translator, and the like. FIG. 3 is a pictorial diagram illustrating an exemplary browser page 300 displaying descriptive attributes of a book with current values and with editable or configurable fields for modifying those descriptive values. Examples of configurable fields include text field 302 and drop-down menu 304. Similarly, FIG. 4 is a pictorial diagram illustrating an exemplary browser page 400 displaying descriptive attributes of an audio CD (corresponding to the music product type).

According to one embodiment, when a consumer wishes to update a product description associated with an item, the consumer, via a browser on a consumer device, such as consumer device 122, will activate a link presenting the consumer with a set of descriptive attributes (according to the item's type) and corresponding current descriptive values. (Examples of item descriptions are shown in FIGS. 3 and 4.) The current descriptive values are placed in configurable data areas such that they can be suitably modified. In some instances, when the choices can be articulated as a finite set, the consumer may be presented with a drop-down menu to select one of the choices, such as drop-down menu 304 (FIG. 3). Other suitable user interface mechanisms may also be used. Still further, other descriptive values are placed in editable regions such that the consumer can modify the text or values, such as text field 302.

Figure 5A:
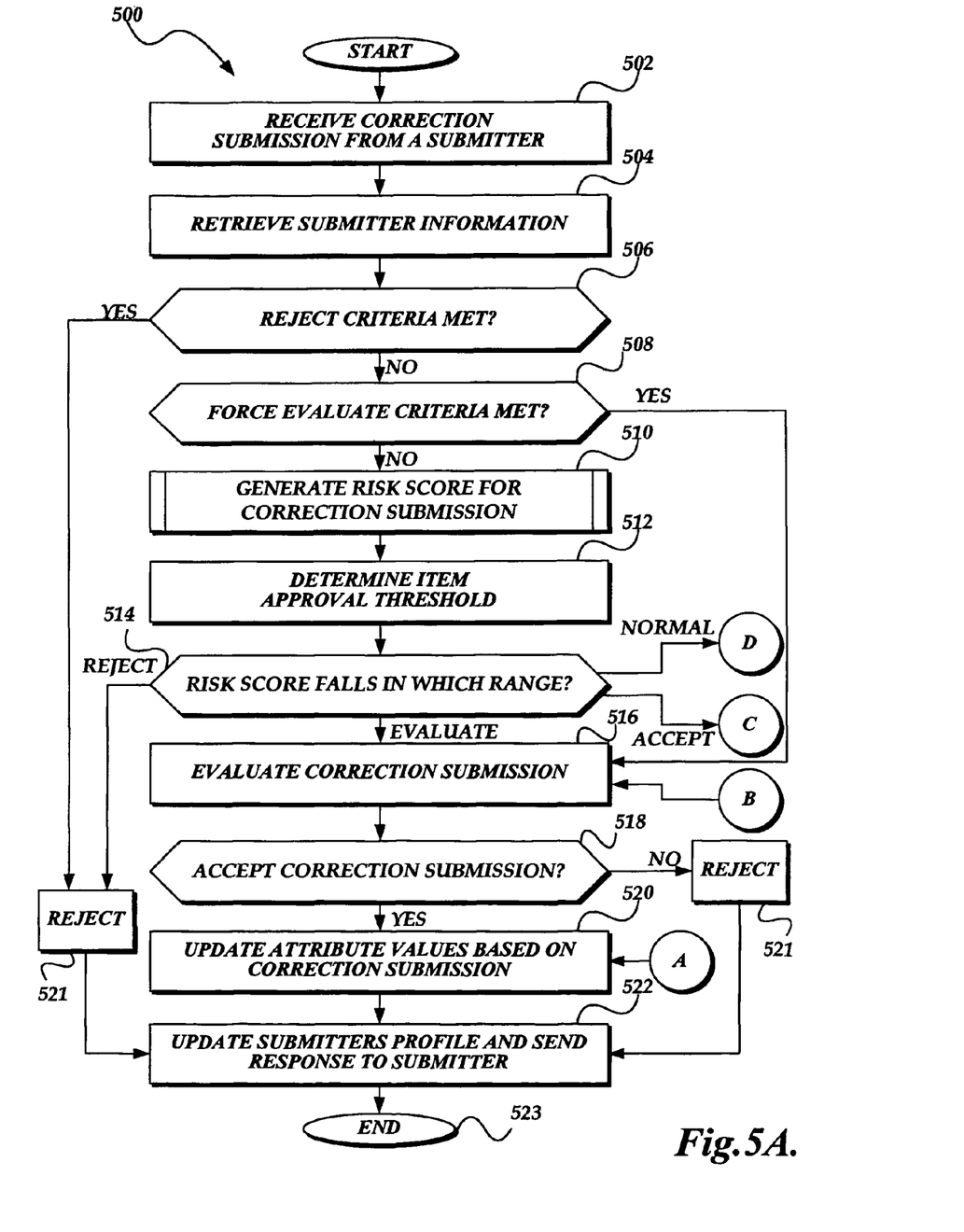
FIGS. 5A-5B illustrate a flow diagram for determining whether to accept or reject a consumer correction submission regarding an item description, in accordance with one or more embodiments.

Turning now to FIG. 5A, this figure illustrates a routine 500 for evaluating a consumer's correction submission such that it may be accepted or rejected, in accordance with one or more embodiments. With regard to the consumer submitting the correction submission, it should be appreciated while that entity is referred to as a consumer, in fact, the submitter may correspond to a supplier, an employee of the vendor site whose task it is to correct item descriptions, a manufacturer, supplier, distributor or vendor of the item, an automated system or some other interested party. Accordingly, while the term consumer correction submission is used, it should be appreciated that the disclosed subject matter, and particularly the submitter, is not restricted to being a consumer of the vendor site.

Beginning at block 502, the consumer's correction submission is obtained. At block 504, the submitting consumer's profile information is retrieved from the consumer profile data store 212. As described above, the consumer's profile may include an explicit indication as to whether or not to accept the consumer's correction submission. Still further, the consumer's profile may include information as to whether to automatically accept or reject any correction submissions from this particular consumer or require a manual evaluation of any correction submissions from the consumer.

At decision block 506, a determination is made as to whether any of various rejection criteria are met such that the correction submission should be rejected without further review. According to certain aspects and by way of illustration, but not limitation, rejection criteria may include corrections directed to particular item descriptions (such as corrections to a well known item), particular attributes of a particular item (e.g., a title and/or author), the value to which an attribute is changed (such as changing a movie rating from general family to adult only), whether the consumer's profile indicates that the system should always reject correction submissions from this consumer, and the like. If the evaluation of the rejection criteria indicates that the consumer's correction submissions should be rejected, the routine 500 proceeds to block 521 and the correction submission is rejected. At block 522, consumer's profile information is updated, in this instance to identify that the correction submission was automatically rejected, and optionally a response is delivered to the consumer. A response may be in the form of an e-mail message indicating to the consumer the decision that has been made with respect to the correction submission.

Returning to decision block 506, if it is determined to not automatically reject the correction submission, at decision block 508 a determination is made as to whether force evaluation criteria are met such that the correction submission is to be evaluated prior to acceptance or rejection. Force evaluation criteria may be, for example, an indication that all correction submissions from the consumer should be evaluated, an indication that all correction submissions of a particular type (e.g., change to title, rating, etc.) for an item should be evaluated, etc. In one embodiment, but not by way of limitation, if the consumer's profile indicates that correction submissions from this consumer should always be evaluated, the force evaluation criteria is met and the routine 500 proceeds to block 516 where the correction submission is evaluated. The evaluation at block 516 may be a manual review of the correction submission to determine whether to accept or reject the consumer correction submission. Returning to decision block 508, if it is determined that the force evaluation criteria has not been met the routine proceeds to subroutine block 510 (FIG. 6) in which a risk score is generated for the correction submission. A risk score may be any type of rating for the item. For example, a risk score may be a scaled numerical rating, a percentage rating, etc. After generating a risk score for the correction submission, at decision block 512 an item approval threshold, which may also be any type of numerical rating, is determined. The item approval threshold may be established, for example, based on results from prior correction submissions for the item, based on the frequency with which correction submissions are submitted for the item, the importance of the item, etc. In one embodiment, the item approval threshold may be segmented into multiple ranges. For example, the item approval threshold may be segmented into an accept range, normal range, evaluate range and a reject range. In alternative embodiments, additional or fewer ranges may be utilized for evaluating correction submissions and the segmentation of ranges described herein is for explanation purposes only and is not intended to be limiting.

At decision block 514 a determination is made as to which item threshold range the risk score generated at subroutine block 510 falls. If it is determined that the risk score falls into the reject range, the routine 500 proceeds to block 521, the correction submission is rejected and the process continues as described above. If it is determined that the risk score falls into the normal range, the routine 500 proceeds to decision block 524 (FIG. 5B) and a determination is made as to whether the consumer is marked for auto-approval. If the consumer is marked for auto-approval, at decision block 526 a further determination is made as to whether the submission should be audited. Auditing, as in typical instances, may be conducted on a random, pseudo-random, or periodic basis (e.g., every $10^{th}$ submission) and may be provided for quality control. In alternative embodiment, if it is determined that the consumer is marked for auto-approval, the correction submission may be approved without determining if an audit should be conducted. If it is determined at decision block 526 that the submission is not to be audited, the routine 500 proceeds to block 520 and the attribute values for the item are updated based on the correction submission. If it is determined at decision block 526 that the correction submission is to be audited or if it is determined at decision block 524 that the consumer is not marked for auto-approval, rather than automatically approving the correction submission, the correction submission is passed on for further evaluation at block 516 as discussed below.

Figure 5B:
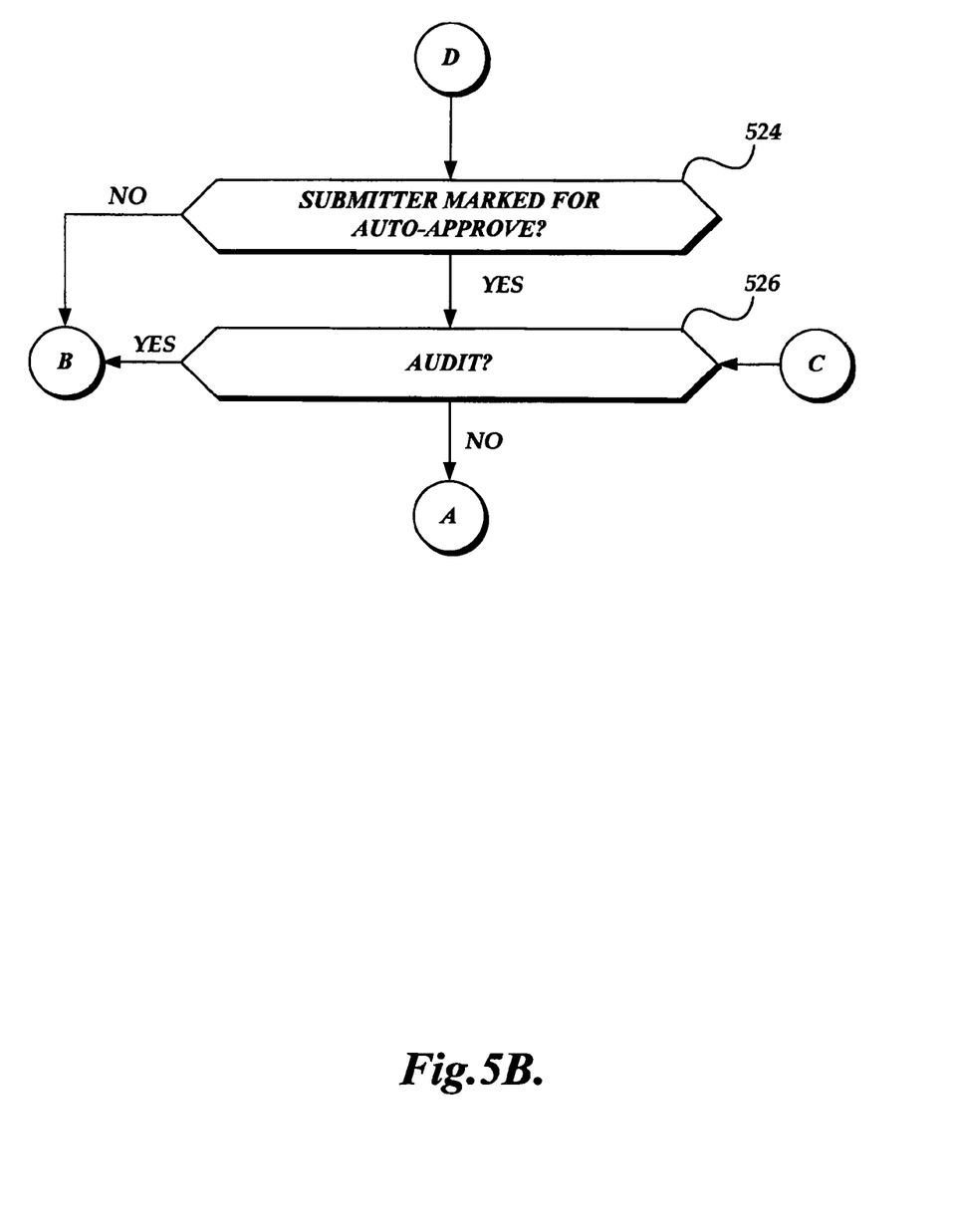

Returning to decision block 514, if it is determined that the risk score falls into the accept threshold range, the routine 500 proceeds to decision block 526 and continues as described above. Finally, if it is determined at decision block 514 that the risk score falls into the evaluate threshold range the routine 500 proceeds to block 516 and the correction submission is evaluated, as described above. Upon evaluation of the correction submission, at decision block 518 a determination is made as to whether to accept the correction submission. If it is determined at decision block 518 that the correction submission should be accepted, at block 520 the attribute values for the item description are updated based on the correction submission. At block 522 the consumer's profile is updated, in this instance to reflect that the correction submission has been accepted and the consumer may optionally be notified in this regard. In contrast, if it is determined at decision block 518 that the correction submission should not be accepted the attribute values are not updated, the correction submission is rejected at block 521 and the consumer's profile is updated at block 522 to reflect that the correction submission has been rejected. In addition, at block 522 a response may optionally be sent to the consumer notifying them that the correction submission has not been accepted. The routine 500 completes at block 523. A consumer's correction submission may include numerous pieces of information and/or data. Utilizing that information, a comparison of the current value of an attribute versus the submitted value of the attribute may be made. For example, assuming an attribute "title" of a book, the current attribute value for the title may be "The Chocolate Factory" whereas the submitted attribute value might be "Charlie and the Chocolate Factory." In this case, the submitted attribute value represents a proposed correction from the consumer.

Figure 6:
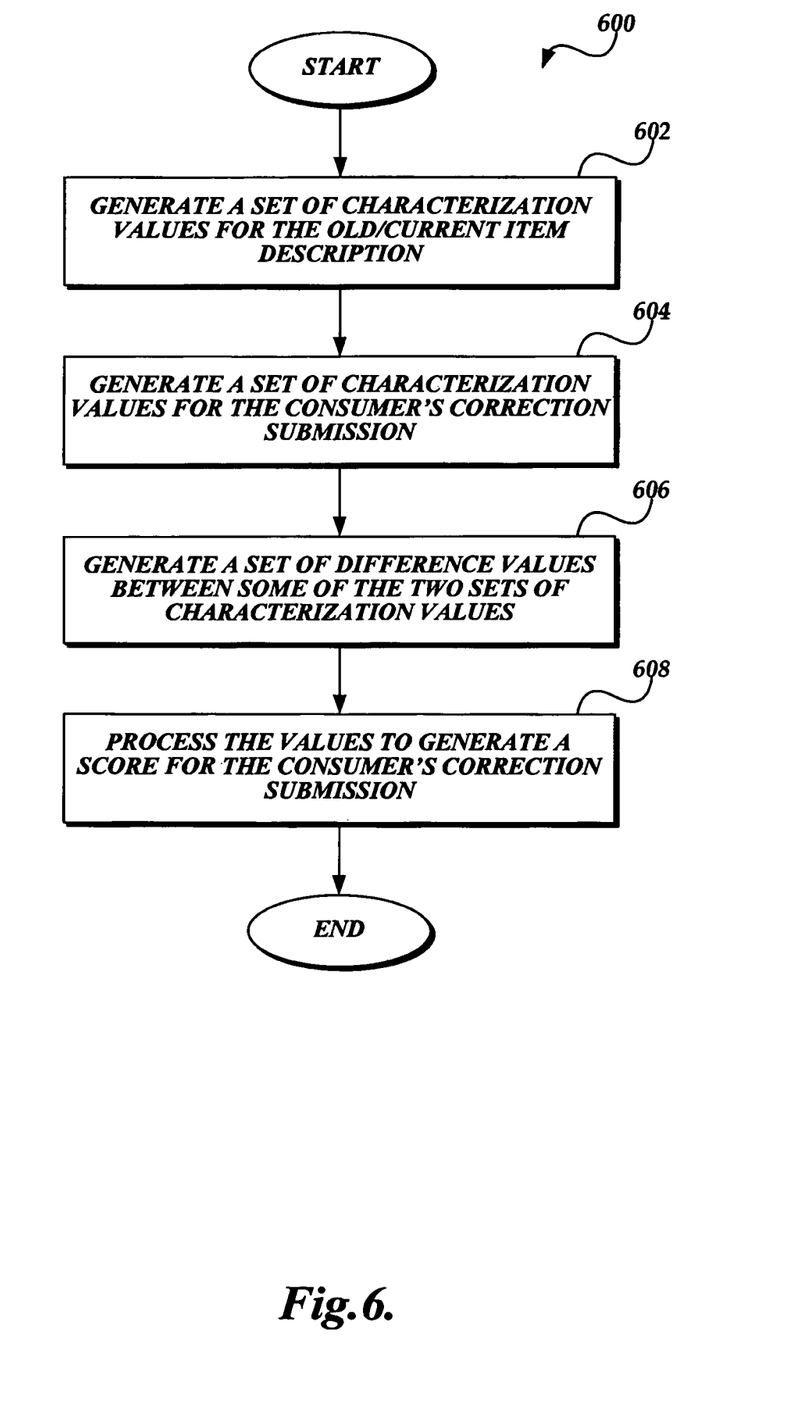
FIG. 6 illustrates a flow diagram for generating a score for a consumer's correction submission, in accordance with one or more embodiments.

As mentioned above in regard to subroutine block 510 of FIG. 5A, a score is generated for a correction submission. To this end, FIG. 6 is a flow diagram of an illustrative subroutine 600 for determining a score for a consumer's correction submission, in accordance with one or more embodiments. In general, the subroutine 600 analyzes the current descriptive values and submitted descriptive values by characterizing each. The characterizations generally, but not exclusively, consist of determining a number of quantifying and/or descriptive elements of each value. For example, the length or number of characters in the value (for both the current descriptive value and submitted descriptive value) is one descriptive element. Another one might be the number of capital letters in each descriptive value. Another may be the number of punctuation characters in each descriptive value. Another may be a count of word matches from an inappropriate language dictionary. Many of these quantities or descriptive elements together characterize each descriptive value. The characterization consists of determining a number of quantifying or descriptive elements (i.e., criteria) of each descriptive value of both the current descriptive value and the submitted descriptive value string including, but not limited to:

a length value corresponding to the count of characters in the descriptive value string;

a lowercase character count corresponding to the count of lowercase characters in the descriptive value string;

an uppercase character count corresponding to the count of uppercase characters in the descriptive value string;

a punctuation count corresponding to the count of punctuation characters in the descriptive value string;

a word count corresponding to the count of words in the descriptive value string;

a significant word count corresponding to the count of significant words (e.g., words with more than 3 characters) in the descriptive value string;

a capital word count corresponding to the count of capitalized words in the descriptive value string;

an odd capitals count corresponding to the count of words with odd capitalization (e.g., uppercase letters in the middle of a word or multiple uppercase letters in a word) in the descriptive value string;

a repeat count corresponding to the maximum any character is repeated in an adjacent sequence in the descriptive value string;

an uppercase word count corresponding to the count of all uppercase words in the descriptive value string;

a significant lowercase word count corresponding to the count of significant (e.g., words with more than 3 characters) that are all lowercase;

a trouble word count corresponding to the count of trouble words and/or expressions (from a list of trouble patterns) that are found in the descriptive value string;

an offensive words count corresponding to the count of offensive words and/or expressions (from a list of offensive patterns) that match the descriptive value string;

a significant word set corresponding to the set of significant words in the descriptive value string; and a word set corresponding to the set of all the words in the descriptive value string.

Of course, descriptive values for elements associated with drop-down menus will likely use a different set of characterizations and may include additional, fewer or some other combination of characterizations.

In the illustrative subroutine 600, at block 602 a set of characterization values are generated for the current descriptive value, and at block 604 a corresponding set of characterization values are generated for the submitted descriptive value. For purposes of description, characterizing descriptive values generated according to the above and other criteria will generally be termed C1, C2, C3, . . . , Cn. More particularly, the characterization of the original descriptive values will be termed OC1, OC2, OC3, . . . OCn, ie, "Original Characterization n". Alternatively, for the characterization of the submitted (or "new") descriptive value, the characterization values will be termed NC1, NC2, NC3, . . . NCn, ie, "New Characterization n".

In addition to generating the characterization values for each descriptive value string, at block 606 the differences between the set of characterization values are determined, yielding yet another set of values, termed difference values. These difference values will be termed D1, D2, D3, . . . Dm, where D1 represents the difference between a given pair of corresponding characterization values, such as OC1 and NC1, D2 represents a difference between another pair of corresponding characterization values, such as OC2 and NC2, etc. Of course, while the characterization values may often result in a numeric value, the computation of the differences for individual values may be derived differently than a simple numeric difference. For example, with regard to the differences between word sets in each string, the differences may be based not only on the ordinal value of exact matches between words, but also on words that match according to a Levenshtein score (taking into account a particular threshold). Similarly, a difference value may be generated from the same set of characterization values such as a word difference score that measures the number of words not found in common to both word sets that further takes into account the Levenshtein score and a threshold.

At block 608, the various values, both characterization values and difference values, are then processed by a scoring algorithm that yields a numeric score corresponding to a confidence value that the consumer's correction submission is accurate and/or acceptable. After processing the values to generate a numeric score, the routine 600 terminates.

In one embodiment, the scoring algorithm applies mathematical function to each element and sums the result according to the formula:

$$\text{Score} = \sum_{x=1}^{n} FOx(OCx) + \sum_{x=1}^{n} FNx(NCx) + \sum_{x=1}^{m} FDx(Dx)$$

where FOx(OCx) is a function applied to the characterizing values of the original product descriptive value string, FNx(NCx) is a function applied to the characterizing values of the consumer's correction submission, FDx(Dx) is a function applied to the difference values, n corresponds to the number of characterization values generated for each of the original and new descriptive values, and m corresponds to the number of difference values determined between the original and new descriptive values: ie. m<=n as not all characterization values may be used in difference calculations. In this manner, the overall score corresponds to a risk value that the consumer's new correction submission is accurate and/or acceptable, where the risk value is based on the current and new characterizations, their differences, and mathematical formulae that may include weighting the various characterizations differently. Stated somewhat differently, the resulting score corresponds to an estimation of the risk in automatically accepting the consumer's correction submission.

In regard to the various functions applied to the characterization values and difference values, while there are any number of specific functions that may be applied, these functions may include, by way of illustration only, an identity function, a weighting/scaling function (to enhance or diminish the value), a null function, and an inverse function.

Preferably, the resulting risk score groups small or trivial changes between the current and new descriptive values at one end of the scale and large or significant changes at the other end. By way of example and not by means of limitation, trivial changes result in a low score, perhaps in the range of 0 to 100, while significant changes fall in the range of 500 and greater. In this manner, the risk score describes the degree of change between the old or current product description and the submitted product description. Alternatively, the risk score might also be viewed as a measure of the risk of whether the submitted correction is good or not. The product type of the subject item and the attribute type to which the submission applies determines three threshold values (accept, force, reject) to use in considering the score. These thresholds may come from a data store indexed by the product-type and attribute-type or may be considered as a function T(threshold, product-type, attribute-type). For example, T(accept, book, title) is the function determining the "accept" threshold for a submission suggesting a change to a book's title. As depicted below, four ranges on the scale are defined by the three threshold values.

Going from low risk to high risk on the scale, the ranges have the following significance. The first range is for scores falling below the accept threshold and indicates an automated decision to accept the submission. The next range defined from the accept to the force threshold indicates no automated decision should be made. The range above the force threshold up to the reject threshold indicates submissions with these scores will necessitate (force) an evaluation, such as by a human reviewer. The final range above the reject threshold indicates an automated decision to reject the submission can be made.

While various embodiments have been illustrated and described, including the preferred embodiment, it will be appreciated that various changes can be made therein without departing from the spirit and scope of the invention.

The embodiments of the invention in which an exclusive property or privilege is claimed are defined as follows:

1. A method for generating a risk score for use in automated processing of correction submissions, the method comprising:
    performing by one or more computers:
        receiving correction information specifying a proposed correction of a specific attribute of an item description for an item, the item description including a plurality of attributes that describe the item including said specific attribute;
        generating a first set of one or more characterization values for the proposed correction to the specific attribute according to a first set of one or more criteria;
        generating a second set of one or more characterization values for the current value of the specific attribute according to a second set of one or more criteria;
        generating one or more difference values between one or more corresponding characterization values of the first and the second sets of one or more characterization values;
        based on the one or more difference values, generating a risk score for the proposed correction, the risk score quantifying a level of risk associated with automatically accepting the proposed correction to the specific attribute; and
        storing the risk score in a data store.

2. The method of claim 1, further comprising:
    performing one or more summation operations on the first and second sets of one or more characterization values in order to generate the risk score.

3. The method of claim 2, wherein there is a one-to-one correspondence between the characterization values of the first and second sets of characterization values.

4. The method of claim 2,
    wherein said one or more summation operations are also performed on the one or more difference values.

5. The method of claim 1,
    wherein said generating the first set of the one or more characterization values comprises determining a number of words or phrases in the proposed correction that are found in a trouble words data store, and
    wherein said generating the second set of the one or more characterization values comprises determining a number of words or phrases in the current value of the specific attribute that are found in the trouble words data store.

6. The method of claim 1,
wherein said generating the first set of the one or more characterization values comprises determining a number of words or phrases in the proposed correction that are found in an offensive words data store, and
wherein said generating the second set of the one or more characterization values comprises determining a number of words or phrases in the current value of the specific attribute that are found in the offensive words data store.

7. The method of claim 1,
wherein said generating the first set of the one or more characterization values comprises determining a number of words in the proposed correction, and
wherein said generating the second set of the one or more characterization values comprises determining a number of words or phrases in the current value of the specific attribute.

8. A method for generating a risk score for use in automated processing of correction submissions, the method comprising:
performing, by one or more computers:
receiving correction information specifying a proposed correction of a specific attribute of an item description for an item, the item description including a plurality of attributes that describe the item including said specific attribute;
generating a first set of one or more characterization values for the proposed correction to the specific attribute according to a first set of one or more criteria;
generating a second set of one or more characterization values for the current value of the specific attribute according to a second set of one or more criteria;
generating one or more difference values between one or more corresponding characterization values of the first and the second sets of one or more characterization values, wherein the one or more difference values are each associated with a comparison between the current value of said specific attribute and said proposed correction;
based on the one or more difference values, generating a risk score for the proposed correction, the risk score quantifying a level of risk associated with automatically accepting the proposed correction to the specific attribute; and
storing the risk score in a data store.

9. The method of claim 8, further comprising:
performing one or more summation operations on the first and second sets of one or more characterization values and the one or more difference values in order to generate the risk score.

10. The method of claim 9, wherein there is a one-to-one correspondence between the characterization values of the first and second sets of characterization values.

11. A computer-implemented system for generating a risk score for use in automated processing of correction submissions, the system comprising:
a computing device having an executable scoring module which generates a risk score for a correction submission from a submitter;
a description data store storing a plurality of item descriptions; and
a submitter profile data store storing information regarding a plurality of correction submitters;
wherein the scoring module when executed by one or more processors of the computing device is configured to:
receive the correction submission from the submitter, the correction submission specifying a proposed correction of a specific attribute of an item's item description stored in the description data store, the item description including a plurality of attributes that describe the item including said specific attribute;
generate a first set of one or more characterization values for the proposed correction to the specific attribute according to a first set of one or more criteria;
generate a second set of one or more characterization values for the current value of the specific attribute according to a second set of one or more criteria;
generate one or more difference values between one or more corresponding characterization values of the first and the second sets of one or more characterization values;
based on the one or more difference values, generate a risk score for the proposed correction, the risk score quantifying a level of risk associated with automatically accepting the proposed correction to the specific attribute; and
store the risk score in the description data store.

12. The system of claim 11, wherein the scoring module is further configured to:
perform one or more summation operations on the first and second sets of one or more characterization values in order to generate the risk score.

13. The system of claim 12,
wherein said one or more summation operations are also performed on the one or more difference values.

14. A computer-implemented system for generating a risk score for use in automated processing of correction submissions, the system comprising:
a computing device having an executable scoring module which generates a risk score for a correction submission from a submitter;
a description data store storing a plurality of item descriptions; and
a submitter profile data store storing information regarding a plurality of correction submitters;
wherein the system is configured to:
receive correction information specifying a proposed correction of a specific attribute of an item description for an item, the item description including a plurality of attributes that describe the item including said specific attribute;
generate a first set of one or more characterization values for the proposed correction to the specific attribute according to a first set of one or more criteria;
generate a second set of one or more characterization values for the current value of the specific attribute according to a second set of one or more criteria;
generate one or more difference values between one or more corresponding characterization values of the first and second sets of one or more characterization values, wherein the one or more difference values are each associated with a comparison between the current value of said specific attribute and said proposed correction;
based on the one or more difference values, generate a risk score for the proposed correction, the risk score quantifying a level of risk associated with automatically accepting the proposed correction to the specific attribute; and
store the risk score in the description data store.

15. A non-transitory computer-readable medium bearing computer-executable instructions which, when executed on a computing device, carry out a method for generating a score for use in automated processing of correction submissions, the method comprising:
- receiving correction information specifying a proposed correction of a specific attribute of an item description for an item, the item description including a plurality of attributes that describe the item including said specific attribute;
- generating a first set of one or more characterization values for the proposed correction to the specific attribute according to a first set of one or more criteria;
- generating a second set of one or more characterization values for the current value of the specific attribute according to a second set of one or more criteria;
- generating one or more difference values between one or more corresponding characterization values of the first and the second sets of one or more characterization values;
- based on the one or more difference values, generating a risk score for the proposed correction, the risk score quantifying a level of risk associated with automatically accepting the proposed correction to the specific attribute; and
- storing the risk score in a data store.

* * * * *